US006353066B1

(12) United States Patent
Sosa

(10) Patent No.: US 6,353,066 B1
(45) Date of Patent: Mar. 5, 2002

(54) METHOD FOR PRODUCING COPOLYMERS IN THE PRESENCE OF A CHAIN TRANSFER AGENT

(75) Inventor: Jose M. Sosa, Deer Park, TX (US)

(73) Assignee: Fina Technology, Inc., Houston, TX (US)

( * ) Notice: Subject to any disclaimer, the term of this patent is extended or adjusted under 35 U.S.C. 154(b) by 0 days.

(21) Appl. No.: 09/780,186

(22) Filed: Feb. 9, 2001

(51) Int. Cl.[7] .......................... C08F 2/38; C08F 236/20
(52) U.S. Cl. .................. 526/224; 526/336; 526/347
(58) Field of Search ................. 526/224, 336, 526/347

(56) References Cited

U.S. PATENT DOCUMENTS

| 5,059,667 A | * 10/1991 | Nakamura | 526/336 X |
| 5,455,321 A | * 10/1995 | Cummings et al. | 526/347 X |
| 5,473,031 A | 12/1995 | Tinetti et al. | |
| 5,663,252 A | 9/1997 | Pike et al. | |
| 6,127,455 A | 10/2000 | Dohard et al. | |

FOREIGN PATENT DOCUMENTS

| EP | 1041108 A1 | * 10/2000 |
| GB | 2244713 | * 12/1991 |

OTHER PUBLICATIONS

Rubens, L. C., "Some Effects of Crosslinking Upon the Foaming Behavior of Heat Plastified Polystyrene," Journal of Cellular Plastics, Apr. 1965.

* cited by examiner

*Primary Examiner*—Fred Teskin
(74) *Attorney, Agent, or Firm*—Hitt Gaines & Boisbrun

(57) ABSTRACT

The present invention provides a method of producing a copolymer. The method comprises placing a vinylbenzene, such as styrene, in a reactor, placing a cross-linking agent, such as divinylbenzene in the reactor, placing a chain transfer agent, such as mercaptan, in the reactor and forming a poly vinylbenzene in the presence of the cross-linking agent and the chain transfer agent. In this embodiment, the concentration of the cross-linking agent ranges from about 150 ppm to about 400 ppm and a concentration of the chain transfer agent ranges from about 100 to about 400 ppm.

20 Claims, 3 Drawing Sheets

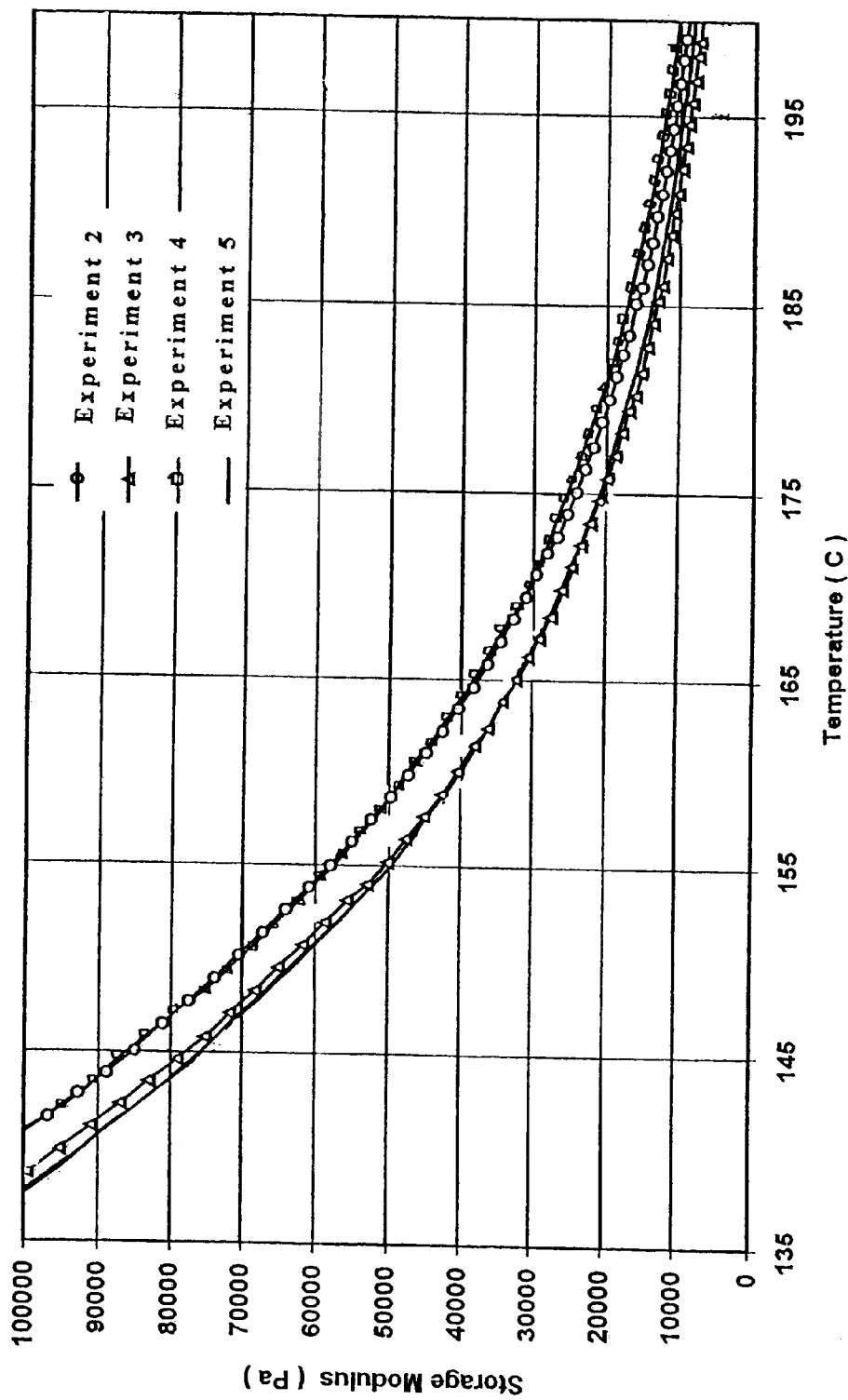

METHOD FOR PRODUCING COPOLYMERS IN THE PRESENCE OF A CHAIN TRANSFER AGENT

TECHNICAL FIELD OF THE INVENTION

The present invention is directed, in general, to a method of manufacturing a copolymer and, more specifically, to a method of manufacturing a poly vinylbenzene in the presence of a cross-linking agent and a chain transfer agent.

BACKGROUND OF THE INVENTION

The polymerization of styrene is a very important industrial process that supplies materials used to create a wide variety of polystyrene-containing articles. This expansive use of polystyrene results from the ability to control the polymerization process. Thus, variations in the polymerization process conditions are of utmost importance since they in turn allow control over the physical properties of the resulting polymer. The resulting physical properties determine the suitability of a polystyrene for a particular use. For a given product, several physical characteristics must be balanced to achieve a suitable polystyrene material. Among the properties that must be controlled and balanced are weight averaged molecular weight ($M_w$) of the polymer, molecular weight distribution (MWD), melt flow index (MFI), and the storage modulus (G').

U.S. Pat. No. 5,540,813 by Sosa, et. al. (Sosa '813), which is incorporated herein by reference, discloses a process for preparing monovinyl aromatic polymers, such as polystyrene, which utilizes a combination of sequentially ordered multiple reactors, heat exchangers and devolatilizers to strictly control polymer properties such as the molecular weight distribution and melt flow index.

While the Sosa '813 patent discloses methods for controlling the molecular weight distribution and melt flow index, it does not address the relationship between the molecular weight and the storage modulus. This relationship is of particular importance in polymer foam applications. Such foam applications require high molecular weight polymers having a high storage modulus. It is thought that the storage modulus is related to the degree of branching along the polymer chain. As the degree of branching increases, the likelihood that a branch connects two different polymer chains increases. This inter-chain interaction is known as cross-linking. A polymer product having a higher degree of branching or cross-linking tends to have a higher storage modulus and, therefore, better foam stability characteristics.

Methods for preparing branched polymers are well-known in the art. For example, the preparation of branched polystyrene by free radical polymerization has been reported in U.S. Pat. Nos. 5,473,031 and 5,663,253 issued to Tinetti, et. al., and Pike, et. al., respectively. Both methods increase the branching in the devolatilization step and produce a polymer with an undesirably low molecular weight.

Rather than employing free radical polymerization, U.S. Pat. No. 4,918,159 issued to Idemitsu teaches the use of multi-functional mercaptans to form branched polymers. While materials having an acceptable molecular weight can be prepared by this method, these products are unacceptable for foam applications due to their undesirable flow properties.

The properties of randomly branched polystyrene prepared in the presence of divinylbenzene have been reported by Rubens (L. C. Rubens, J. of Cellular Physics, pp 311–320, 1965). However, polymers having a useful combination of molecular weight and cross-linking are not attainable. At low concentrations of divinylbenzene, low molecular weight polymers having little branching result. However, higher concentrations of the cross-linking agent result in excessive cross-linking and concomitant gel formation. While increasing cross-linking generally correlates with the polymer storage modulus, formation of a gel is highly undesirable in industrial polystyrene processes. Similar results and problems were reported by Ferri and Lomellini (J. Rheol. 43(6), 1999).

Thus what is needed in the art is a process for monovinyl aromatic polymers that produces a branched or very slightly cross-linked product that has a high molecular weight, a high storage modulus at foaming and is suitable for foam applications.

SUMMARY OF THE INVENTION

To address the deficiencies of the prior art, the present invention provides a method of producing a copolymer. In an advantageous embodiment, the method comprises placing a vinylbenzene, such as styrene, in a reactor, placing a cross-linking agent, such as divinylbenzene in the reactor, placing a chain transfer agent, such as mercaptan, in the reactor and forming a poly vinylbenzene in the presence of the cross-linking agent and the chain transfer agent. In this embodiment, the concentration of the cross-linking agent ranges from about 150 ppm to about 400 ppm and a concentration of the chain transfer agent ranges from about 100 to about 400 ppm.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the invention, reference is now made to the following descriptions taken in conjunction with the accompanying drawing, in which:

FIG. 3 illustrates graphical data indicating the storage modulus as a function of temperature for several of polymer products.

DETAILED DESCRIPTION

In the present invention, polymerization processes for the preparation of copolymers, such as polyvinylbenzene copolymers, are disclosed. The present invention is particularly useful with polymerization systems such as those disclosed in the aforementioned Sosa '813 patent.

Figure 1:
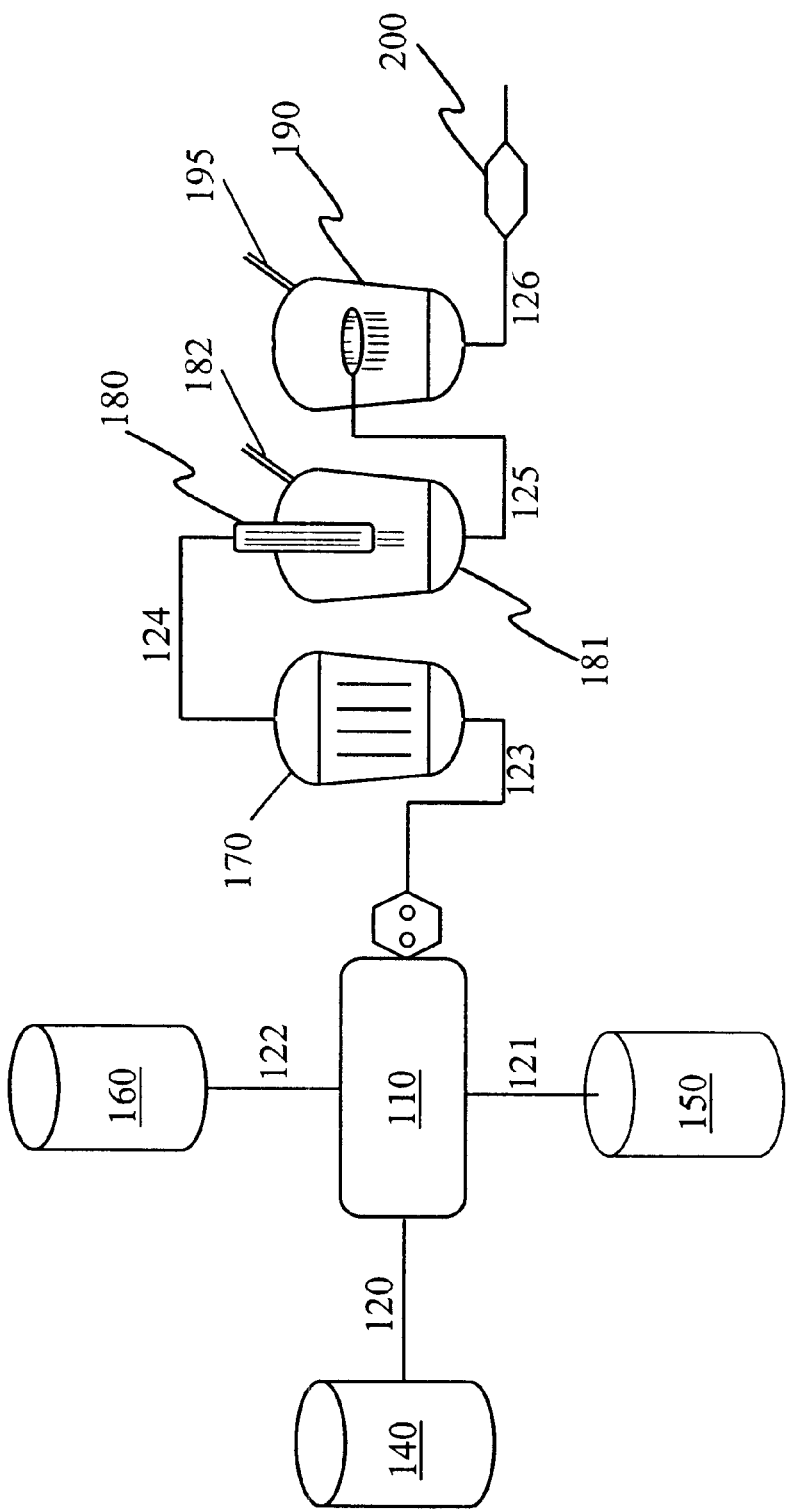
FIG. 1 illustrates a schematic representation of the polymerization system that can be used in conjunction with the present invention.

Referring initially to FIG. 1, there is illustrated a schematic representation of the polymerization system 100 of the present invention having a stirred tank reactor 110. Reactor 110 may comprise a series of reactors for manufacturing polystyrene. Flowlines 120, 121, and 122 link the reactor 110 with storage reactant containers 140, 150, and 160.

In an embodiment of the present invention, flowline 120 transports a vinylbenzene from storage container 140 to the reactor 110. Also, in this embodiment flowlines 121 and 122 transport a cross-linking agent and a chain transfer agent from storage containers 140 and 150, respectively, to the reaction vessel 110 where the vinylbenzene, cross-linking agent and chain transfer agent are combined.

In one embodiment the vinylbenzene may be styrene and a preferred cross-linking agent may be a divinylbenzene. one who is killed in the art understands that substituted vinylbenzene and substituted divinylbenzene molecules or other tri- or tetra-functional monomers may also be employed. The concentration of the cross-linking agent in the mixture may vary. However, in a preferred embodiment, the cross-linking agent's concentration may range from about 200 ppm to about 400 ppm. If the concentration of the cross-linking agent is too low the molecular weight, $M_w$ of the resulting polymer may be too low, and if the concentration of the cross-linking agent is too high an undesirable gel may form.

The chain transfer agent is preferably a member of the mercaptan family. Particularly useful mercaptans include n-octyl mercaptan, t-octyl mercaptan, n-dodecyl mercaptan, t-dodecyl mercaptan, tridecyl mercaptan, tetradecyl mercaptan, and hexadecyl mercaptan. In advantageous embodiments, the concentration of the mercaptan may range from about 100 ppm to about 400 ppm. Again, if the concentration of chain transfer agent is too low the storage modulus, G' is not improved. However, if the concentration is too high the molecular weight Mw of the resulting polymer is too low to used to manufacture certain products.

In an exemplary embodiment, the reactor 110 containing the vinylbenzene, cross-linking agent and the chain transfer agent is heated sufficiently to cause a polymerization reaction. The polymerization may alternatively be chemically initiated. in either case, the reactor 110 may also include a diluent. One particular diluent is ethyl benzene. Such processing parameters and initiators are well known to those skilled in the art. However, in a particular embodiment the reactor 110 may be heated to a temperature ranging from about 100° C. to about 180° C. and for a period ranging from about 4 hours to about 6 hours. The particular conditions of the heating process may be determined by monitoring the percent conversion in reactor 110. Those who are skilled in the art appreciate that the percent conversion indicates the amount of polymer products that have been produced. In a preferred embodiment, the percent conversion in reactor 110 is approximately 70%. After passing through the reactor 110, the resulting polymer mixture enters the heat exchanger 170 through flowline 123. Heat exchanger 170 is preferably an upflow heat exchanger and may be operated at a temperature sufficient to induce polymerization, about 160° C. The polymer then flows from heat exchanger 170 through flowline 124 to the downflow heat exchanger 180. Downflow heat exchanger 180 may be maintained at a temperature of about 245° C. and may be situated in a flash devolatilization tank 181 having a vapor removal line 182 and maintained at a pressure in the range of about 20 torr to about 200 torr.

After having been at least partially devolatilized in the devolatilization tank 181, the polymer mixture passes through flow line 125 to a second devolatilizer 190 having a hoop falling strand configuration and is operated at a pressure of about less than 1 Torr to about 20 Torr. Volatile components are removed through vapor line 195. Then, flowline 126 transports the polymer mixture from devolatilizer 190 to a finishing operation such as pelletizer 200. More details of the operation of the reactor system illustrated in FIG. 1 may be found in Sosa '813.

EXAMPLES

Table I illustrates specific examples taken from pilot plant operations utilizing the process of the present invention. For example, a control experiment was performed wherein neither a cross liking agent nor a chain transfer agent where present during the polymerization. After devolatilization, the weight averaged molecular weight of the product polystyrene is 388,000 and the storage modulus G' is 79,000 Pa at 145° C.

The effect of the cross-linking agent on the polymer product of this process was investigated in Experiment 1. In this example styrene was polymerized in the presence of divinylbenzene at a concentration of 200 ppm and no chain transfer agent was present in the mixture. The weight averaged molecular weight increased to 660,000. However, the storage modulus decreased to 70,000 Pa at 145° C.

It had been believed that the presence of a chain transfer agent in a polymerization would effect the amount of cross-linking and therefore, lower the storage modulus of the resulting polymer. However, when styrene was polymerized in the presence of 250 ppm of divinylbenzene and 200 ppm of n-dodecyl mercaptan, the weight averaged molecular weight remained high at 652,000 and the storage modulus unexpectedly increased to 85,000 Pa at 145° C.

Several other conditions were employed in Experiments 3, 4, and 5 in an effort to optimize the molecular weight and storage modulus of the polymer product. Styrene was polymerized in the presence of 250 ppm of divinylbenzene and 400 ppm of n-dodecyl mercaptan where the weight averaged molecular weight decreased to 587,000. Under these conditions the storage modulus decreased slightly to 78,000 Pa at 145° C. Changing the concentration of divinylbenzene and n-dodecyl mercaptan to 350 ppm and 200 ppm, respectively, produced a polystyrene with a weight averaged molecular weight of 735,000 and a storage modulus of 75,000 Pa at 145° C. When the concentrations of divinylbenzene and n-dodecyl mercaptan were 350 ppm and 400 ppm, respectively, the resulting polystyrene had a weight averaged molecular weight of 733,000 and a storage modulus of 80,500 Pa at 145° C. The effect of higher concentrations of chain transfer agent was also explored in Experiments 6 and 7. Under these conditions both the molecular weight of the polymer and the storage modulus were reduced.

The effects of higher concentrations of chain transfer agent were also explored. As Table I indicates, concentrations of n-dodecyl mercaptan of 500 ppm resulted in polymer products having unacceptably low molecular weights and storage moduli.

TABLE I

|  | Control | 1 | 2 | 3 | 4 | 5 | 6 | 7 |
|---|---|---|---|---|---|---|---|---|
| divinyl-benzene (ppm) | 0 | 200 | 250 | 250 | 350 | 350 | 150 | 0 |
| n-dodecyl mercaptan (ppm) | 0 | 0 | 200 | 400 | 200 | 400 | 500 | 500 |
| $M_W$ (in thousands) | 388 | 660 | 652 | 587 | 735 | 733 | 324 | 249 |
| G' (KPa) at 145° C. | 79.0 | 70.0 | 85.0 | 78.0 | 75.0 | 80.5 | 50 | 48 |

Figure 2:
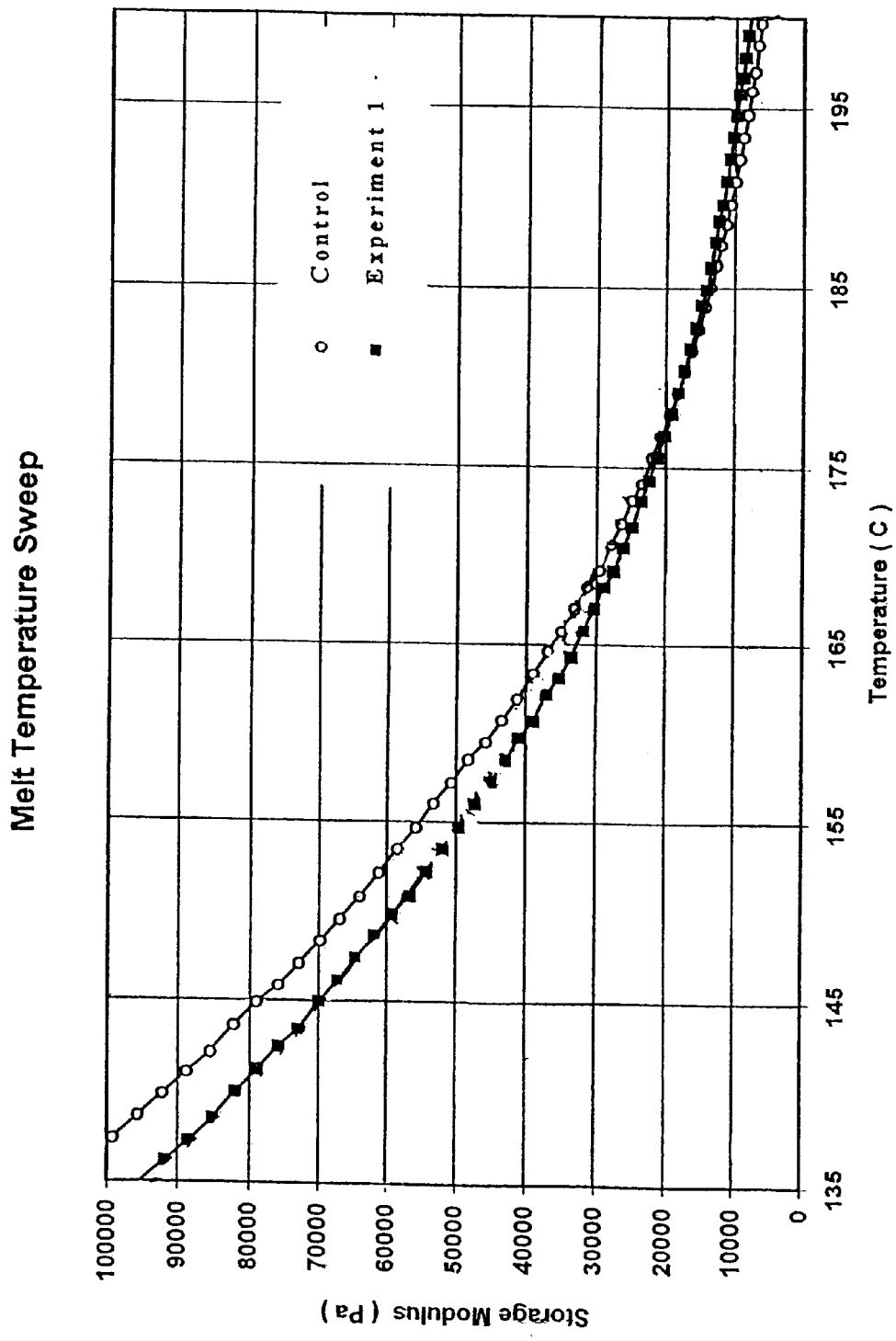
FIG. 2 illustrates graphical data indicating the storage modulus as a function of temperature for a control group and an experimental group of polymer products.

FIGS. 2 and 3 show the storage modulus as a function of temperature for several of the polymer products prepared as indicated by Table I. Thus, as Table I and FIGS. 2 and 3 indicate, the various parameters can be varied to achieve desired levels of polymer properties. Certain properties, for instance the molecular weight or storage modulus, can be optimized for a particular use by adjusting either the cross-linking agent or chain transfer agent or both. In this process the presence of a cross-linking agent and a chain transfer agent increases the molecular weight to desired levels without gel formation problems and unexpectedly maintains or increases the storage modulus.

Although the present invention has been described in detail, those skilled in the art should understand that they can make various changes, substitutions and alterations herein without departing from the spirit and scope of the invention in its broadest form.

What is claimed is:

1. A method of producing a copolymer, comprising:
    placing a vinylbenzene in a reactor;
    placing a cross-linking agent in the reactor;
    placing a chain transfer agent in the reactor; and
    forming a poly vinylbenzene in the presence of the cross-linking agent and the chain transfer agent, wherein a concentration of the cross-linking agent ranges from about 150 ppm to about 400 ppm and a concentration of the chain transfer agent ranges from about 100 to about 400 ppm.

2. The method as recited in claim 1 wherein placing the vinylbenzene includes placing a styrene in the reactor.

3. The method as recited in claim 1 wherein placing the cross-linking agent includes placing a divinylbenzene in the reactor.

4. The method as recited in claim 1 wherein placing a chain transfer agent includes placing a mercaptan in the reactor.

5. The method as recited in claim 4 wherein the mercaptan is n-dodecyl mercaptan.

6. The method as recited in claim 4 wherein the mercaptan is n-octyl mercaptan, t-octyl mercaptan, t-dodecyl mercaptan, tridecyl mercaptan, tetradecyl mercaptan, and hexadecyl mercaptan.

7. The method as recited in claim 1 wherein the concentration of the cross-linking agent is about 250 ppm and the concentration of the chain transfer agent is about 200 ppm.

8. The method as recited in claim 1 wherein the concentration of the cross-linking agent is about 250 ppm and the concentration of the chain transfer agent is about 400 ppm.

9. The method as recited in claim 1 wherein the concentration of the cross-linking agent is about 350 ppm and the concentration of the chain transfer agent is about 200 ppm.

10. The method as recited in claim 1 wherein the concentration of the cross-linking agent is about 350 ppm and the concentration of the chain transfer agent is about 400 ppm.

11. The method as recited in claim 1 wherein forming the poly vinylbenzene includes forming a poly vinylbenzene having a storage modulus ranging from about 70,000 Pa to about 85,000 Pa.

12. The method as recited in claim 11 wherein forming the poly vinylbenzene includes forming a poly vinylbenzene having a molecular weighted average ranging from 500,000 to about 750,000.

13. The method as recited in claim 1 wherein forming the poly vinylbenzene includes forming a poly vinylbenzene having a molecular weighted average ranging from 500,000 to about 750,000.

14. A method of forming a polystyrene, comprising:
    placing a vinylbenzene in a reactor;
    placing a divinylbenzene in the reactor;
    placing a n-dodecyl mercaptan in the reactor; and
    forming a cross-linked polystyrene in the presence of the divinylbenzene and the n-dodecyl mercaptan, wherein a concentration of the divinylbenzene ranges from about 150 ppm to about 400 ppm and a concentration of the n-dodecyl mercaptan ranges from about 100 to about 400 ppm.

15. The method as recited in claim 14 wherein the concentration of the divinylbenzene is about 250 ppm and the concentration of the n-dodecyl mercaptan is about 200 ppm.

16. The method as recited in claim 14 wherein the concentration of the divinylbenzene is about 250 ppm and the concentration of the n-dodecyl mercaptan is about 400 ppm.

17. The method as recited in claim 14 wherein the concentration of the divinylbenzene is about 350 ppm and the concentration of the n-dodecyl mercaptan is about 200 ppm.

18. The method as recited in claim 14 wherein the concentration of the divinylbenzene is about 350 ppm and the concentration of the n-dodecyl mercaptan is about 400 ppm.

19. The method as recited in claim 14 wherein forming the polystyrene includes forming a polystyrene having a storage modulus ranging from about 70,000 Pa to about 85,000 Pa.

20. The method as recited in claim 19 wherein forming the polystyrene includes forming a polystyrene having a molecular weighted average ranging from 500,000 to about 750,000.

* * * * *